United States Patent
Uebayashi et al.

(10) Patent No.: US 6,310,868 B2
(45) Date of Patent: *Oct. 30, 2001

(54) SIGNAL TRANSMISSION METHOD, MOBILE STATION DEVICE, AND BASE STATION DEVICE FOR CDMA MOBILE COMMUNICATION SYSTEM

(75) Inventors: Shinji Uebayashi; Motohiro Tanno, both of Yokohama (JP)

(73) Assignee: NTT Mobile Communications Network Inc., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,619
(22) PCT Filed: Jun. 17, 1997
(86) PCT No.: PCT/JP97/02090
  § 371 Date: Feb. 12, 1998
  § 102(e) Date: Feb. 12, 1998
(87) PCT Pub. No.: WO97/49202
  PCT Pub. Date: Dec. 24, 1997

(30) Foreign Application Priority Data

Jun. 20, 1996 (JP) .................................................. 8-160278

(51) Int. Cl.[7] .................................................. H04B 7/216
(52) U.S. Cl. .......................... 370/335; 370/342; 455/522
(58) Field of Search ................................. 370/328, 329, 370/335, 342, 208, 269; 455/422, 450, 516, 517, 522; 375/130

(56) References Cited

U.S. PATENT DOCUMENTS 5,056,109 * 10/1991 Gilhousen et al. .................. 370/342

(List continued on next page.)

FOREIGN PATENT DOCUMENTS

| 0 682 419 | 11/1995 | (EP) | H04B/7/005 |
| 2296627 | 3/1996 | (GB) | H04B/7/005 |
| 8-502151 | 3/1996 | (JP) | |
| WO96/31014 | 10/1996 | (JP) | |

OTHER PUBLICATIONS

A Packet Multiple Access for CDMA Networks, Shinji Uebayashi and Motohiro Tanno, NTT Mobile Communications Network Inc., Tokyo, Japan, Proceedings of The 1996 Communications Society Conference of IEICE, B–322, p. 323, Sep., 1996.

(List continued on next page.)

Primary Examiner—Ajit Patel
Assistant Examiner—Bob A. Phunkulh
(74) Attorney, Agent, or Firm—Brown Raysman Millstein Felder & Steiner LLP

(57) ABSTRACT

A CDMA communications system that can shorten a delay time until the establishment of traffic, and prevent excessive transmission power. Although transmission request signals RQ1, RQ2, RQ3, . . . sent from mobile stations through a common channel undergo only open loop power transmission control, and hence have large fluctuations in their received levels, their interference amount to message signals can be kept low because their received power is averagely about 1/a of that of the message signals MSG1, MSG2, MSG3, . . . The message signals are sent from the mobile stations in accordance with the power transmission control bits contained in a forward link signal ACK sent from the base station, followed by closed loop power transmission control. This enables the received level fluctuations at the base station to be kept low. Closed loop transmission power control of a reverse link signal RQ can further reduce the interference amount, in which case the power transmission control signal can be removed from the forward link signal ACK transmitted from the base station.

25 Claims, 8 Drawing Sheets

U.S. PATENT DOCUMENTS

| | | | |
|---|---|---|---|
| 5,218,620 | | 6/1993 | Mori et al. . |
| 5,265,119 | * | 11/1993 | Gilhousen et al. ............... 370/335 |
| 5,404,376 | * | 4/1995 | Dent ................................. 375/200 |
| 5,430,760 | | 7/1995 | Dent . |
| 5,485,486 | * | 1/1996 | Gilhousen et al. ............... 370/335 |
| 5,544,156 | * | 8/1996 | Teder et al. ...................... 370/342 |
| 5,544,196 | * | 8/1996 | Tiedemann, Jr. et al. ........ 375/145 |
| 5,566,165 | * | 10/1996 | Sawahashi et al. ............... 370/342 |
| 5,570,353 | * | 10/1996 | Keskitalo et al. ................ 370/335 |
| 5,590,409 | * | 12/1996 | Sawahashi et al. ............... 455/69 |
| 5,689,815 | * | 11/1997 | Yamazaki et al. ................ 455/69 |

OTHER PUBLICATIONS

Slotted DS/SSMA Aloha with Packet Combining in a Rayleigh Fading Channel, Amir M. Y. Bigloo, T. Aaron Guilver: Carleton University, Ottawa, Canada, and Vijay K. Bhargawa: University of Victoria, Victoria, Canada, IEEE VTC, pp. 1710–1714, May, 1996.

Spread Spectrum Slot Reservation Multiple Access, Riaz Esmailzadeh, Nobukazu DOI, Hironari Masui, Yasuo Ohgoshi and Takashi Yano: IEEE VTC, pp. 1715–1719, May, 1996.

A Study on Transmit Power Control in CRMA, Motohiro Tanno and Shinji Uebayashi, NTT Mobile Communications Network, Inc., Tokyo, Japan, Proceeedings of The 1996 Communications Society Conference of IEICE, B–322, pp. 332, Sep., 1996.

Power Imbalance Effects on Packet CDMA, C. F. Kou and H. Leib, IEEE JSAC, vol. 14, No. 9, pp. 1830–1840, Dec., 1996.

* cited by examiner

SIGNAL TRANSMISSION METHOD, MOBILE STATION DEVICE, AND BASE STATION DEVICE FOR CDMA MOBILE COMMUNICATION SYSTEM

TECHNICAL FIELD

The present invention relates to a signal transmission method, a mobile station and a base station in a CDMA communications system for carrying out communications in a code division multiple access scheme.

More particularly, the present invention relates to a signal transmission method by which a mobile base station transmits a signal to a base station in a CDMA communications system, and to a mobile station and a base station for implementing the signal transmission method.

BACKGROUND ART

In the mobile communications system, since a reverse link signal transmitted from a mobile station is affected by distance attenuation, shadowing, fading or the like, the level of the signal received by a base station sharply fluctuates. In the CDMA communications, however, it is of critical importance for the received signal level to be kept constant, and hence the mobile station carries out power transmission control so that the received signal level of the base station is kept constant.

As the power transmission control method, two methods are widely known: an open loop control method and a closed loop control method. The open loop control method is a technique in which a mobile station receives a forward link signal transmitted from a base station, and sets the transmission level of a reverse link signal in response to the received level of the forward link signal. Although it can be implemented with ease, large control errors will result if the correlation between the reverse link signal and the forward link signal is small. In contrast, the closed loop control is a technique in which the base station receives the reverse link signal transmitted by the mobile station, makes a decision whether its received level is higher or lower than a reference value by comparing them, and commands the mobile station to change the transmission level using the forward link signal. Although this method can reduce the control errors in the steady state, the mobile station may continue to transmit with large control error before entering the steady state.

In conventional CDMA mobile communications systems, although the closed loop control method is used in conjunction with the open loop control method, the reverse link signal undergoes only the open loop power transmission control at the beginning of the communications. This will result in large control error, which in turn can cause undue interference to message signals of other mobile stations. Thus, the IS-95 system according to the EIA/TIA standard in the United States sets the transmission power of the initial reverse link signal of the mobile station at a low level to avoid the foregoing problem. If the base station cannot receive the reverse link signal, and hence no channel can be established, the mobile station retransmits the initial signal with increasing the transmission power step by step until the channel is established. Although this method has little possibility to cause the undue interference, it takes a long time until the channel has been established.

In short, a signal transmission method in the CDMA mobile communications has not yet been conceived which can establish the channel in a short delay time without transmitting at unduly large transmission power.

DISCLOSURE OF THE INVENTION

As described above, each mobile station in the CDMA communications system carries out the power transmission control so that the signal level received by the base station is kept constant. The conventional CDMA communications system, however, has a problem in that it cannot achieve highly accurate power transmission control at the initial stage of the communications, and can cause undue interference to the message signals of other mobile stations. To avoid this, the IS-95 system sets the initial transmission power of the reverse link signal at a lower value, and retransmits the initial signal with gradually increasing the transmission power until the channel is established. Although this method has little possibility of causing undue interference, it has a problem in that it takes a long time to establish the channel and wasted signals not received by the base station cause extra interference in spite of their low levels.

The present invention is implemented in view of the foregoing problems. Therefore, an object of the present invention it to provide a signal transmission method, a mobile station and a base station in the CDMA mobile communications system which can establish the channel in a short delay time with avoiding transmission at undue power.

According to the first aspect of the present invention, a signal transmission method of a CDMA mobile communications system carrying out communications between a plurality of mobile stations and a base station by code division multiplex access, the signal transmission method comprises the step of:

setting, in a mobile station, transmission power of an initial portion of a signal to be transmitted to the base station at a value lower than transmission power of a portion following the initial portion.

Here, the signal transmission method of the CDMA mobile communications system may further comprise the step of setting a spreading factor of the initial portion at a value higher than a spreading factor of the portion following the initial portion by setting an information transmission rate of the initial portion lower than that of the following portion.

In the signal transmission method of the CDMA mobile communications system, the step of setting may set, when the plurality of mobile stations randomly access the base station through a common channel at any timings to reserve a channel particular to each mobile station to carry out communications, a signal of the random access through the common channel at a level lower than transmission power of a signal of communications through the channel particular to each mobile station.

In the signal transmission method of the CDMA mobile communications system, a signal transmitted from the base station in response to the signal of the random access through the common channel may include a signal for designating transmission power of a signal transmitted by the mobile station thereafter.

In the signal transmission method of the CDMA mobile communications system, the signal transmission method may be applied to a CDMA mobile communications system in which a mute portion of speech is not sent and a voice signal in a speech spurt portion is encoded into a burst signal to be transmitted, and wherein the step of setting sets a spreading factor, transmission power and a burst length of the burst signal which is transmitted at first after transition from the mute portion to the speech spurt portion at a higher spreading factor, lower transmission power and a longer burst length than those of the following burst signals.

According to the second aspect of the present invention, a mobile station of a CDMA mobile communications system in which a plurality of mobile stations randomly access a base station through a common channel at any timings, and subsequently reserve a channel particular to each mobile station to carry out communications, the mobile station comprises:

means for setting a spreading factor and transmission power of a signal of the random access through the common channel at a higher spreading factor and lower transmission power than those of a signal of communications through the channel particular to each mobile station.

In the mobile station of the CDMA mobile communications system, the mobile station may transmit a random access signal through the common channel, and subsequently receives from the base station a signal designating transmission power, and further comprises means for setting transmission power of a signal to be transmitted at a transmission power value designated by the signal when communicating through the channel particular to the each mobile station.

According to the third aspect of the present invention, a mobile station of the CDMA mobile communications system which suppresses transmission of a mute portion of speech and encodes a voice signal in a speech spurt portion, and transmits burst signals, the mobile station comprises:

means for making a decision whether the burst signals formed by encoding the voice signal to be transmitted are mute or speech spurt portions, and means for setting a spreading factor, transmission power and a burst length of the burst signal which is transmitted at first after transition from the mute portion to the speech spurt portion at a higher spreading factor, lower transmission power and a longer burst length than those of the following burst signals.

According to the fourth aspect of the present invention, a base station of a CDMA mobile communications system in which a plurality of mobile stations randomly access a base station through a common channel at any timings, and subsequently reserve a channel particular to each mobile station to carry out communications, the base station comprises:

means for setting a spreading factor of a receiver of the base station for the common channel at a higher spreading factor than that of a receiver for the channel particular to each mobile station.

In the base station of the CDMA mobile communications system, the base station may comprise means for receiving a random access signal of the mobile station through the common channel and for calculating excess or shortage of transmission power of the mobile station in accordance with a predetermined rule, and means for transmitting to the mobile station a signal commanding a change of the transmission power in response to the calculated value.

According to the fifth aspect of the present invention, a base station of a CDMA mobile communications system which suppresses a mute portion of speech and encodes a voice signal in a speech spurt portion, and transmits burst signals, the base station comprises:

means for making a decision whether a received signal is present or not;

first receiving means for waiting for a received signal with a higher spreading factor while there is no received signal; and second receiving means for receiving a signal with a lower spreading factor after receiving a first burst signal.

BEST MODE FOR CARRYING OUT THE INVENTION

Embodiment 1

Figure 1:
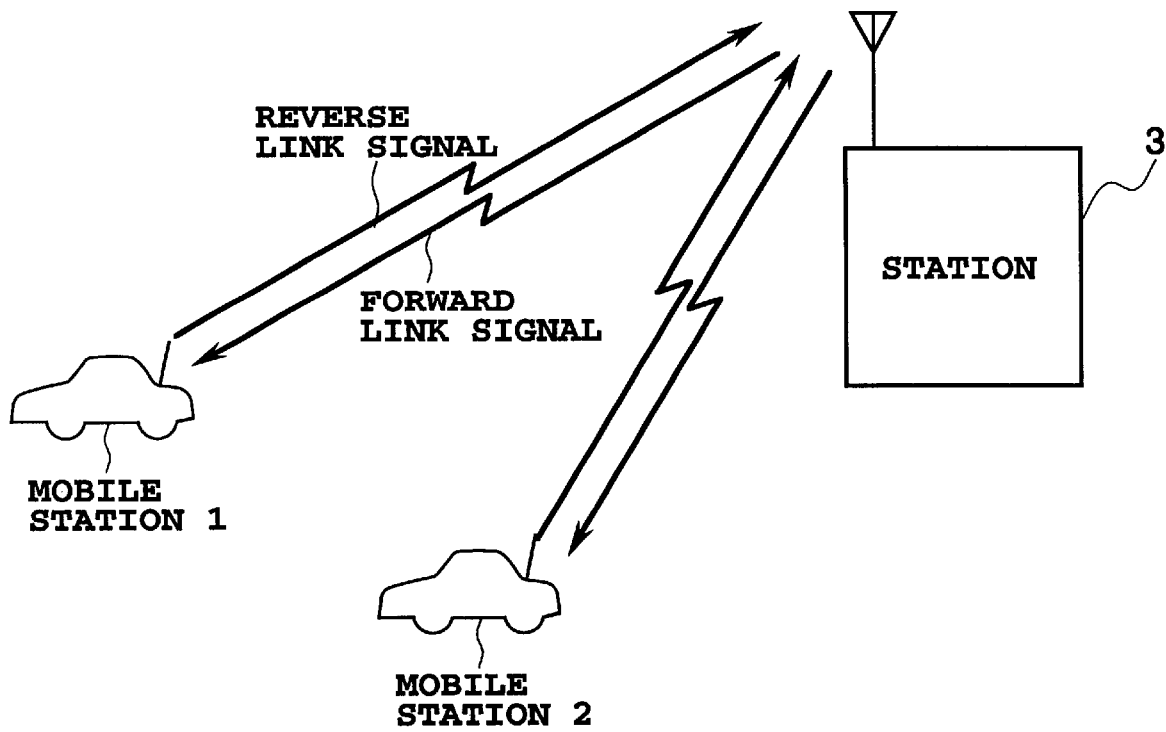
FIG. 1 is a diagram showing an embodiment of a CDMA mobile communications system in accordance with the present invention.

FIG. 1 is a diagram showing an embodiment of a CDMA mobile communications system in accordance with the present invention, which illustrates two mobile stations 1 and 2 communicating with a base station 3 as an example.

Figure 2:
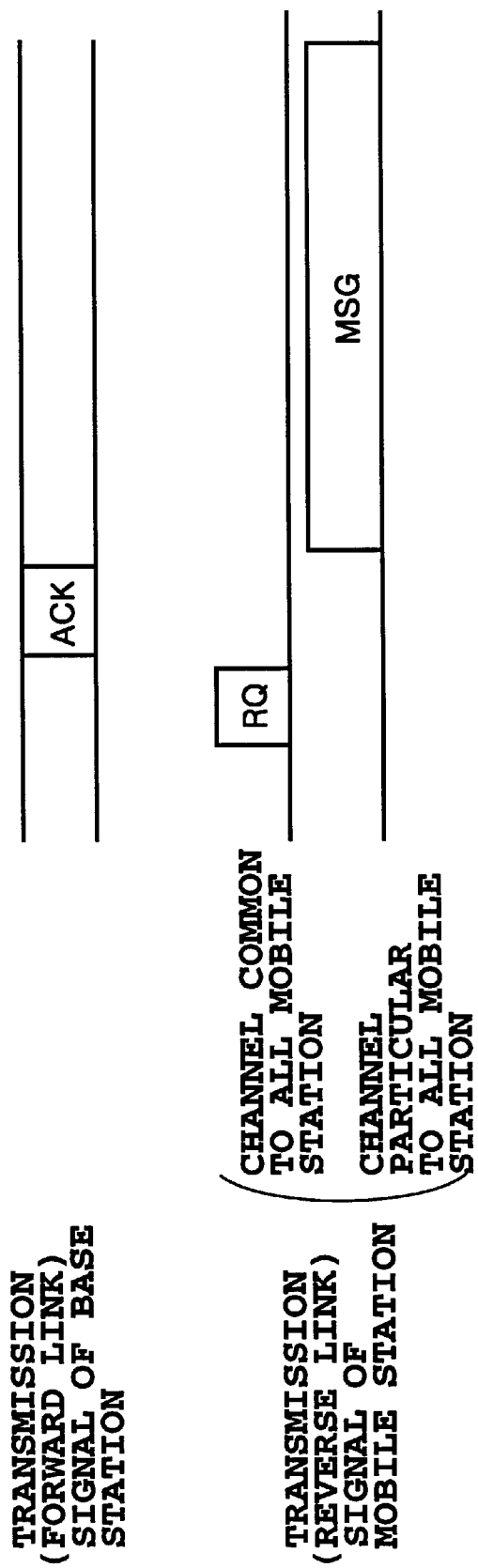
FIG. 2 is a diagram showing a time chart of signals transmitted and received by a mobile station and a base station.

FIG. 2 illustrates a time chart of signals transmitted and received by the mobile station 1, for example, and the base station 3. When the mobile station starts transmission, it first transmits a transmission request signal RQ through a common channel. Receiving the signal RQ from the mobile station, the base station transmits a signal ACK designating a channel particular to the mobile station. Receiving the signal ACK from the base station, the mobile station starts a message signal MSG through the particular channel designated.

Here, let us assume that the transmission power, spreading factor and information transmission rate of the signal RQ are PR, PgR and RR, respectively, that the transmission power, spreading factor and information transmission rate of the signal MSG are PM, PgM and RM respectively, and that PR<PM. For describing a more concrete example, let us assume that PgR=aPgM, and RR=RM/a, where a>1, in which case, the chip transmission rate CR (=PgRRR) of the signal RQ coincides with the chip transmission rate CM (PgMRM) of the signal MSG.

The mobile station measures the received level or signal-to-interference power ratio (SIR) of the forward link signal sent from the base station, and determines the transmission power PR of the reverse link signal RQ. Since PgR=aPgM (a>1), the required received power of the signal RQ at the base station can be 1/a of the required received power of the signal MSG.

The base station measures the received level of the signal RQ, compares it with the required received level, and transmits the signal ACK containing a signal instructing a change of the transmission power (power transmission control bits). Receiving the signal ACK, the mobile station multiplies the PR by a, and then determines the transmission power PM in accordance with the power transmission control bits contained in the signal ACK, thus transmitting the signal MSG at that power.

Figure 3:
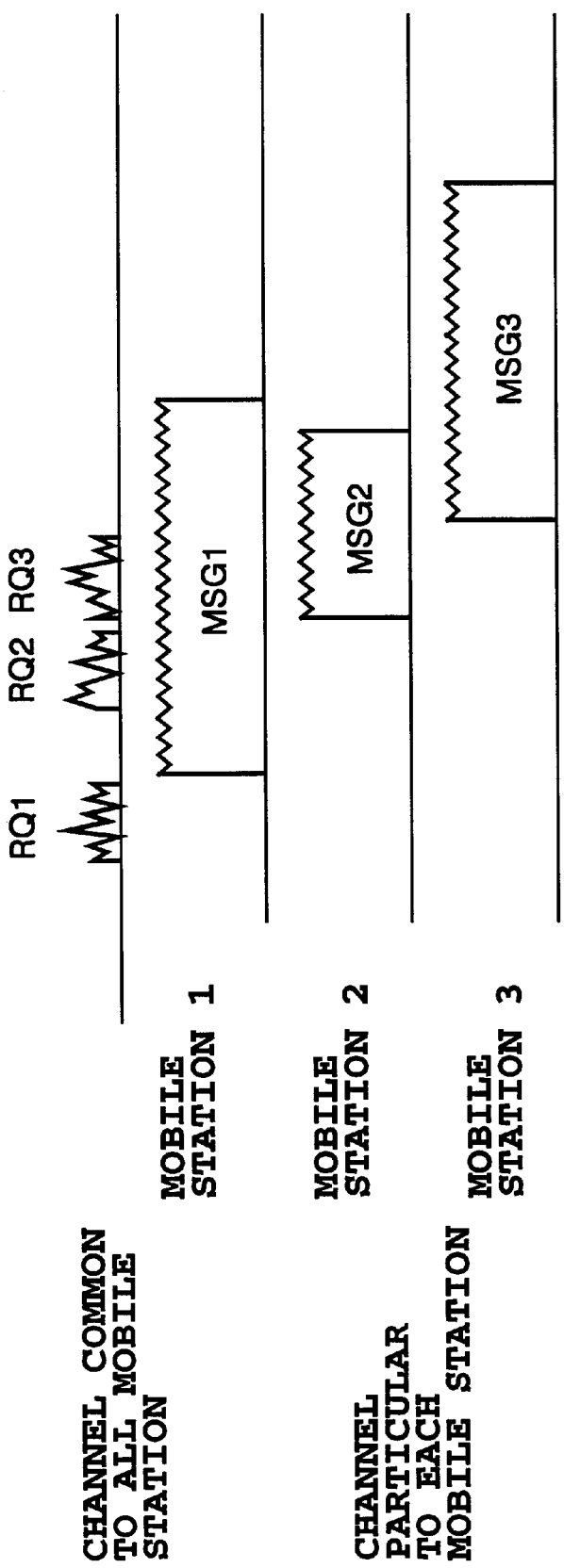
FIG. 3 is a schematic diagram illustrating received signals at the base station in the embodiment.

FIG. 3 schematically illustrates the received signals of the base station in this embodiment. Transmission request signals RQ1, RQ2, RQ3, . . . sent from the mobile stations and received through the common channel have large fluctuations in their received levels because they have large control error due to the open loop power transmission control. These transmission request signals, however, have smaller average received power of about 1/a of that of the message signals MSG1, MSG2, MSG3, . . . , and hence, interferences to the message signals are limited to a small amount. Since the message signals are transmitted in accordance with the power transmission control bits contained in the forward link signals sent from the base station, and the closed loop power transmission control is carried out afterward, the fluctuations in the received levels at the base station are limited to a small level. Performing the closed loop power transmission control during the transmission of the reverse link signal RQ will enable the interference to be further reduced. In this case, it is not necessary for the forward link signal ACK to contain the power transmission control signal.

Figure 4:
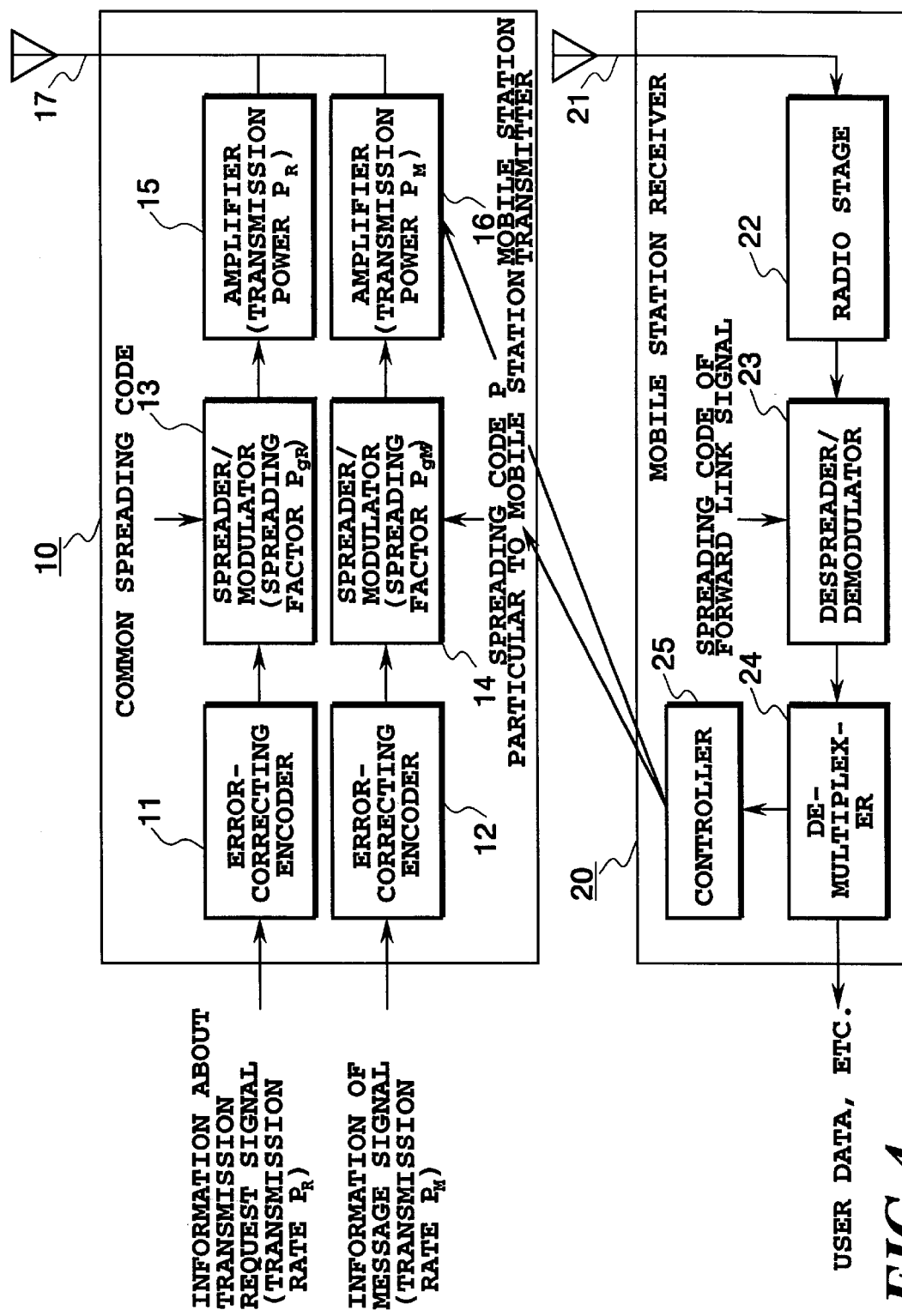
FIG. 4 is a functional block diagram (FIG. 4+ FIG. 5) showing a part of a configuration of a base station and a mobile station for implementing the embodiment.
Figure 5:
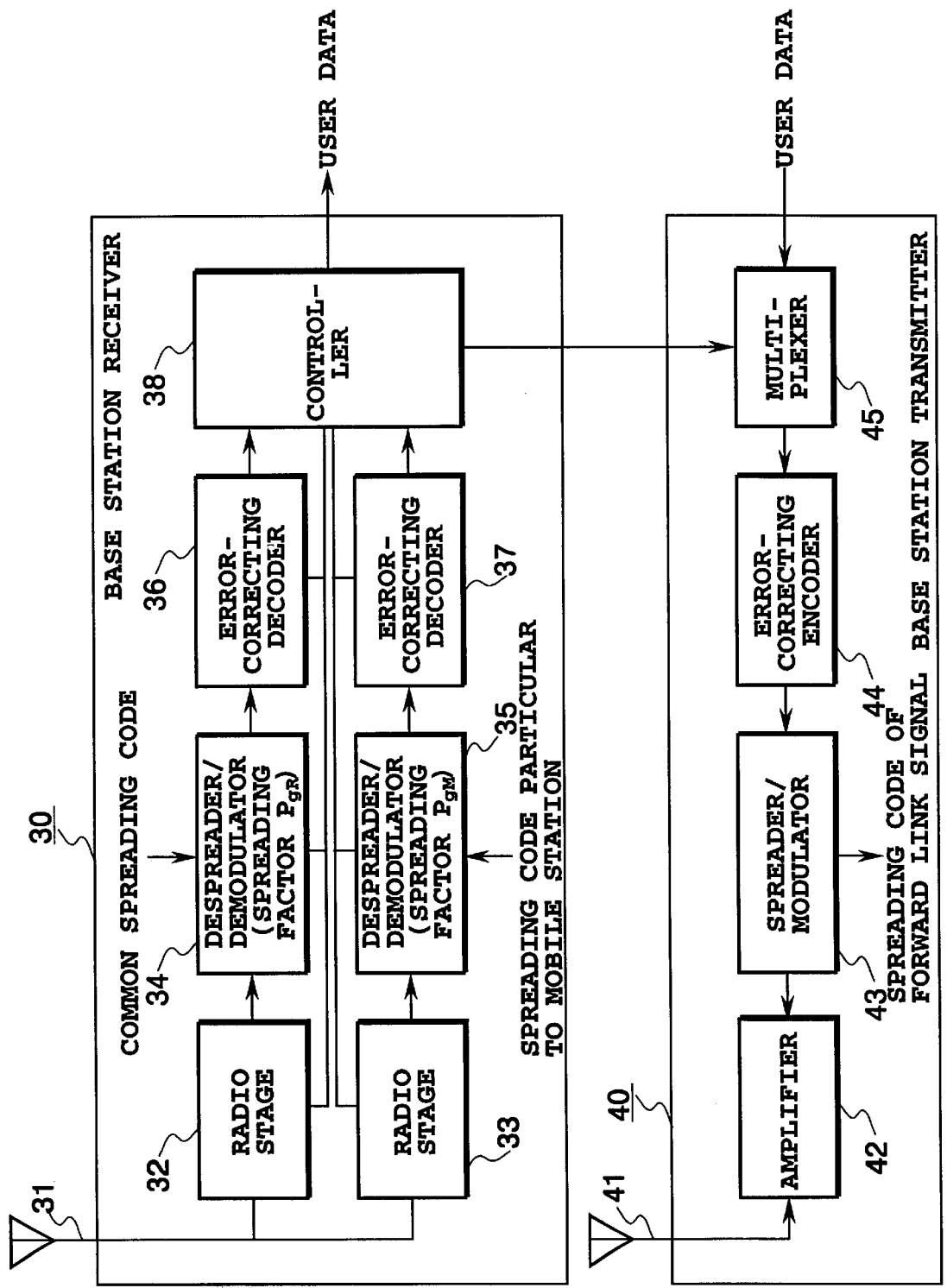
FIG. 5 is a functional block diagram (FIG. 4+ FIG. 5) showing a part of the configuration of the base station and the mobile station for implementing the embodiment.

FIGS. 4 and 5 are functional block diagrams showing a configuration of the base station and mobile station for implementing the present embodiment.

First, a mobile station transmitter 10 will be described. If a packet to be transmitted occurs in the mobile station, an error-correcting encoder 11 carries out error-correcting encoding of the information of the transmission request signal RQ (transmission rate RR), a spreader/modulator (spreading factor PgR) 13 spreads and modulates it using a common spreading code, an amplifier (transmission power PR) 15 amplifies it to the transmission power PR to be transmitted through an antenna 17. With regard to the message signal transmitted thereafter at the transmission rate RM, an error-correcting encoder 12 carries out the error-correcting encoding, a spreader/modulator (spreading factor PgM) 14 spreads and modulates it using a spreading code particular to each mobile station, and an amplifier (transmission power PM) 16 amplifies it to the transmission power PM to be transmitted. The spreading code particular to the mobile station and the transmission power PM are set in response to the control signal ACK, which will be described later.

In a base station receiver 30, a radio stage 32 receives the transmission request signal RQ transmitted from the mobile station, a despreader/demodulator (spreading factor PgR) 34 despreads (spreading factor PgR) and demodulates it using the common spreading code, and an error-correcting decoder 36 carries out error-correcting decoding, thereby outputting the result. A controller 38, acknowledging the reception of the transmission request signal RQ, measures its received level or SIR, and computes the transmission power control value to be transmitted to the mobile station. In addition, it determines a channel of the message signal particular to the mobile station (a spreading code particular to the mobile station), and constructs the control signal ACK in conjunction with the transmission power control value. An error-correcting encoder 44 carries out its error-correcting encoding, a spreader/modulator 43 spreads and modulates it, and an amplifier 42 amplifies it to be transmitted to the mobile station. When receiving the message signal MSG, on the other hand, a radio stage 33 receives it, a despreader/demodulator (spreading factor PgM) 35 despreads it (spreading factor PgM) using the spreading code particular to the mobile station designated by the control signal ACK, and an error-correcting decoder 37 performs its error-correcting decoding.

In a mobile station receiver 20, receiving the control signal ACK through an antenna 21 and radio stage 22, a despreader/demodulator 23 despreads and demodulates it using the spreading code of the forward link spreading code. Subsequently, a demultiplexer 24 demultiplexes the spreading code and power transmission control value from the user data. A controller 25 decodes the spreading code particular to the mobile station, supplies it to the spreader/modulator (spreading factor PgM) 24. In addition, it decodes the power transmission control value to determine the transmission power PM, and supplies it to the amplifier 16.

Although the block for processing the transmission request signal RQ and the block for processing the message signal MSG are depicted separately in FIGS. 4 and 5, they can be implemented by the same hardware in practice.

Embodiment 2

The present invention is applicable when carrying out intermittent communications through channels particular to the mobile stations.

Figure 6:
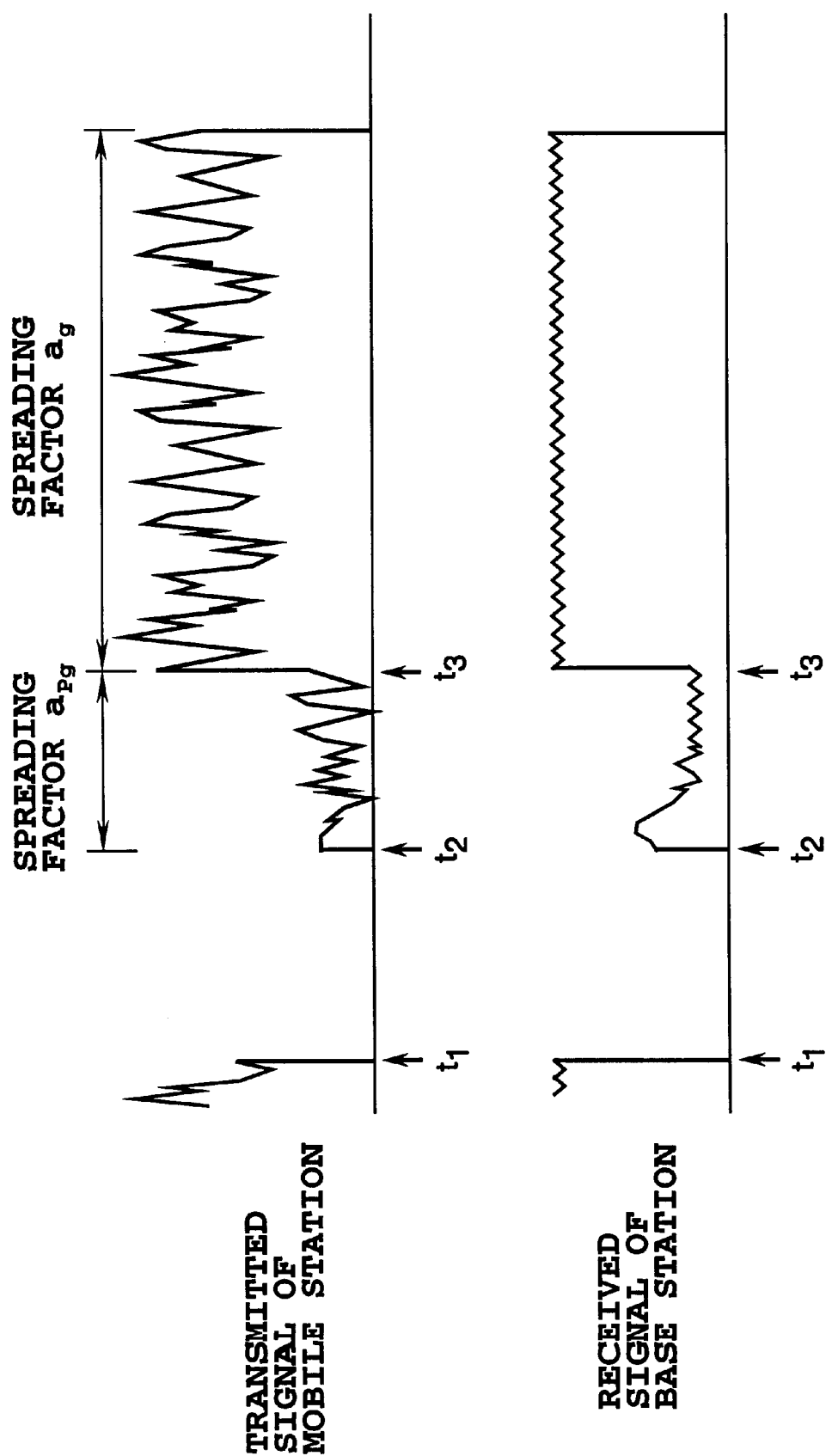
FIG. 6 is a diagram showing a time chart illustrating a transmitted signal by the mobile station and the corresponding received signal by the base station in a second embodiment in accordance with the present invention.

FIG. 6 illustrates a time chart of a transmission signal of a mobile station and the corresponding receiving signal of a base station in a second embodiment in accordance with the present invention. This embodiment is an example that carries out the intermittent communications such as transmitting a speech signal only during speech spurt intervals with suppressing mute intervals in speech communications, thereby carrying out transmission only when data is present with suppressing the transmission when data is absent.

In FIG. 6, the difference between timings t1 and t2 is about 1.3 seconds, and that between the timings t2 and t3 is about 100 milliseconds, for example. In practice, there are much more occasions that the speech spurt intervals are shorter than the mute intervals.

The mobile station makes a transition from a speech spurt state to a mute state and suspends the transmission. While suspending the transmission, the closed loop power transmission control cannot be performed because the base station cannot receive the signal from the mobile station. When the mobile station makes a transition from the mute state to the next speech spurt state at timing t2, it carries out open loop power transmission control in response to the received level of the signal sent from the base station. In this case, the mobile station sets the spreading factor of an initial portion of the signal (from timing t2 to t3) at "a" times the following portion and reduces the transmission power to 1/a that of the following portion. In the course of this, the closed loop power transmission control is started so that the power transmission control error is limited to a sufficiently small value when the transmission power is increased by a factor of a at timing t3.

Although there is a drawback in this case that the information transmission rate reduces at the initial portion of the communications, it matters little in the data communications that does not need immediacy.

Figure 7:
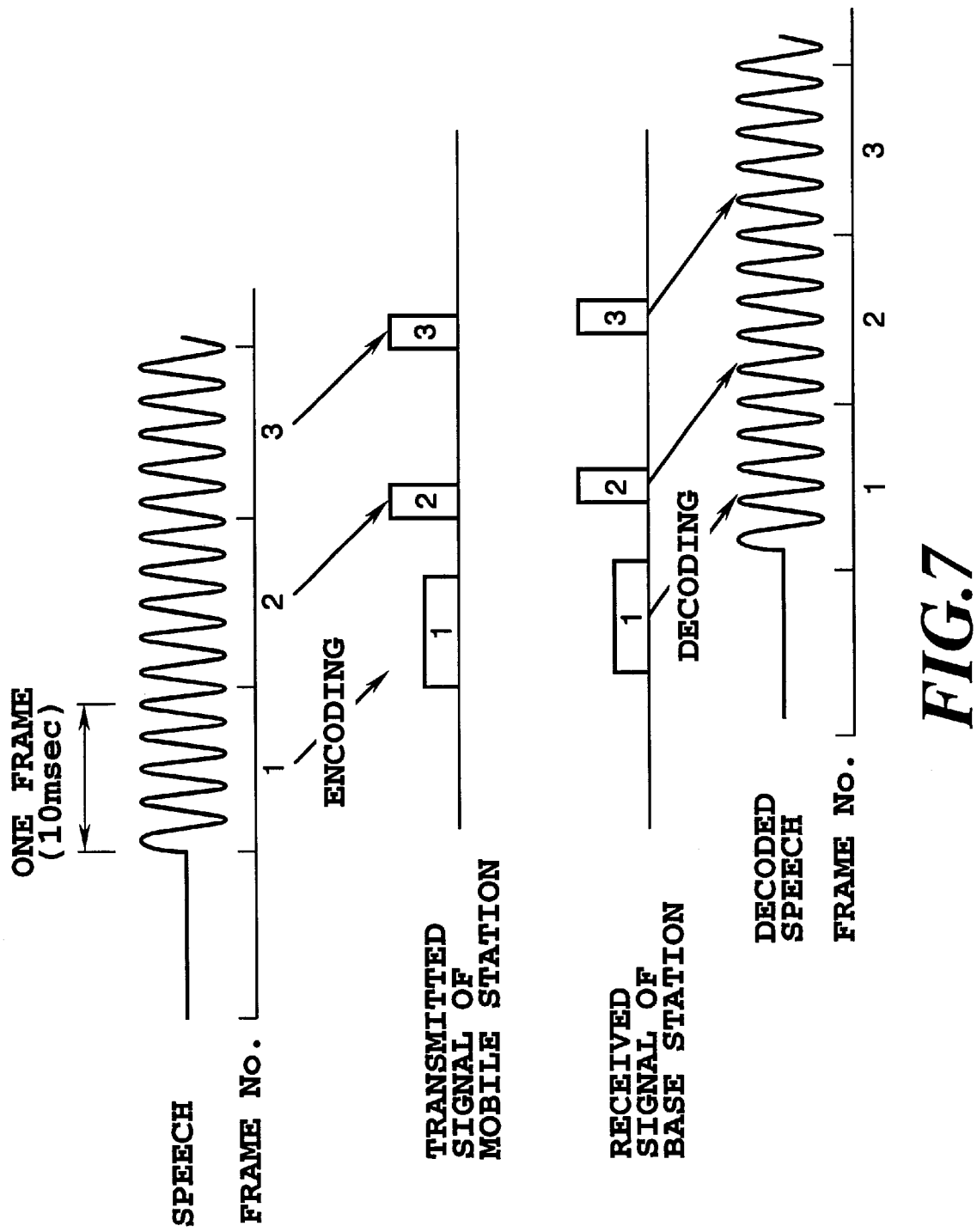
FIG. 7 is a diagram showing a time chart when the present invention is applied to a speech signal.

FIG. 7 illustrates a time chart when the present invention is applied to a voice signal.

In FIG. 7, the frame numbers (frame Nos.) are designated by 1, 2 and 3. In the case where the above-mentioned immediacy is required as in the speech communications, and where the speech signal is transmitted in the burst mode as in the normal case, the transmission time of only the first burst signal is elongated so that the required information transmission rate can be ensured in the initial portion as shown in FIG. 7.

More specifically, with regard to the first signal (frame 1) at the transition from the mute to the speech spurt, spreading factor Pg is multiplied by a, the transmission power is multiplied by 1/a, and the burst length is multiplied by a. According to this scheme, the signal immediately after the transition to the speech spurt causes only small interference to other signals in spite of its possibly large power transmission control error because its transmission power itself is small. In addition, no degradation of the received quality occurs because of large spreading factor Pg, and no reduction in the information amount occurs because of the long burst length.

Figure 8:
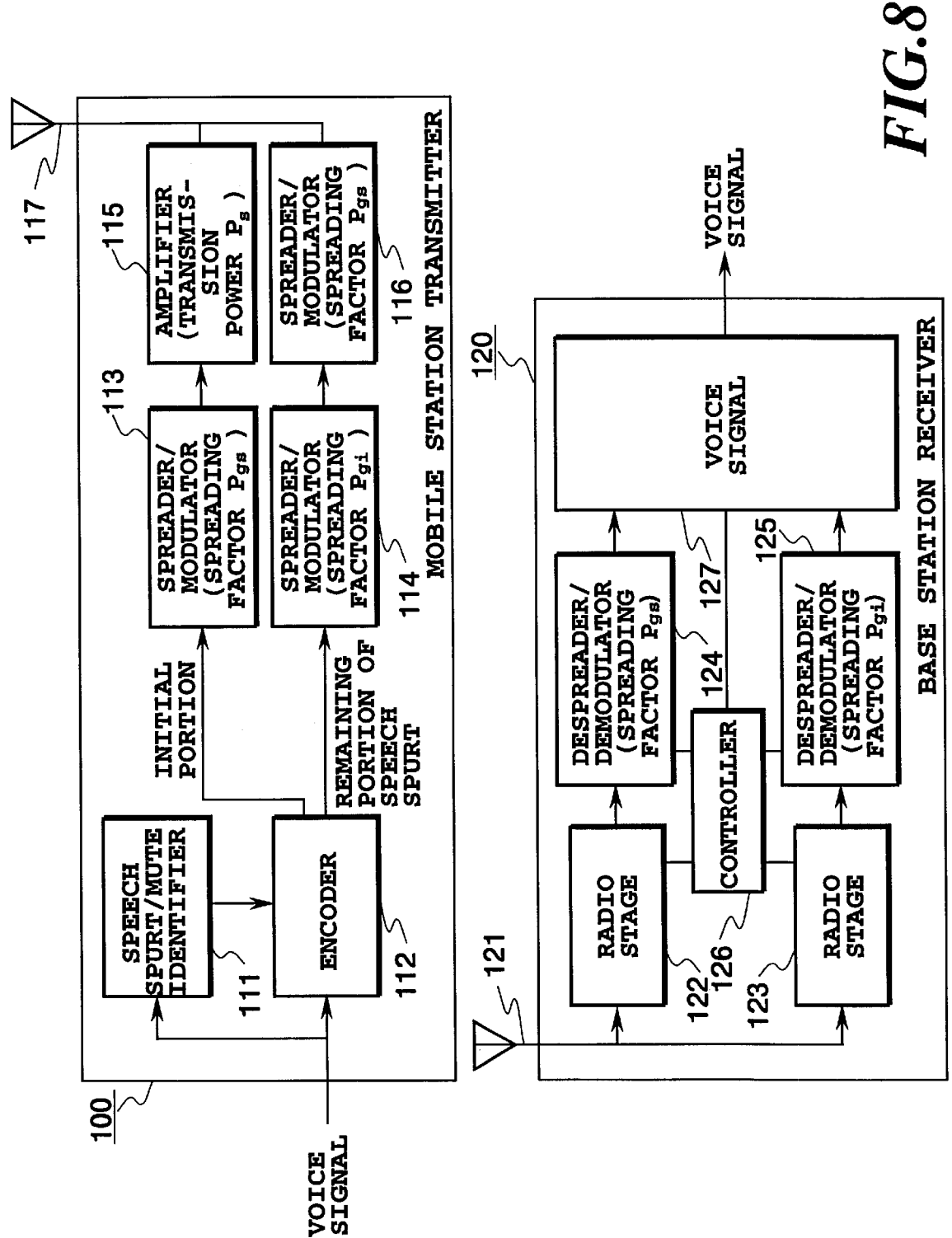
FIG. 8 is a functional block diagram showing a configuration of a base station and a mobile station when the present invention is applied to the speech communications.

FIG. 8 is a functional block diagram showing a configuration of the base station and mobile station for implementing the present embodiment. First, a mobile station transmitter 100 will be described.

A speech spurt/mute identifier 111, receiving a voice signal, makes a decision at each voice signal encoding timing whether it is speech spurt or mute, and supplies a decision signal to an encoder 112. Receiving the voice signal and the decision signal about the speech spurt or mute, the encoder 112 encodes the voice signal in the speech spurt portion, and supplies its initial portion to a spreader/modulator 113 and its remaining portion to a spreader/modulator 114. The encoded voice signal in the initial portion is spread (spreading factor Pgs) and modulated by the spreader/modulator 113, amplified by an amplifier 115 (the transmission power value at time t is denoted as Ps(t)), and transmitted in a burst mode. The transmission time of the encoded voice signal at the initial portion is generally longer than the remaining portions. Although the initial transmission power value Ps(0) is determined by the open loop power transmission control, the following transmission power is determined by the closed loop control so that the control error is reduced gradually. The encoded voice signal of the remaining portions is spread (spreading factor Pgi) and modulated by the spreader/modulator 114, amplified by an amplifier 116, and transmitted at transmission power Pi. The transmission power Pi is set in accordance with the converged transmission power Ps(T) by the close loop control of the initial portion, where T is the period of the burst signal.

A base station receiver 120 receives the signal of the initial portion through an antenna 121 and a radio stage 122, despreads (spreading factor Pgs) and demodulates it by a despreader/demodulator 124, and decodes it to be output as a voice signal. The remaining portion of the speech spurt portion is received by a radio stage 123, despread (spreading factor Pgi) and demodulated by a despreader/demodulator 125, and decoded to be output as a voice signal. Since the base station receiver 120 makes a decision of the speech spurt or mute, a method is effective of adding control signals to the initial and tail portions. Detecting the control signal, a controller 126 decides whether the received burst signal is one at the initial portion or the remaining portions, and controls the functional blocks.

As described above, according to the present invention, the average transmission power is reduced in a region like the first signal of a random access scheme or the initial portion of an intermittent communications, during which sufficient accuracy cannot be obtained in the power transmission control by the reason of the initial portion of the message signal. This makes it possible to achieve communications without causing undue interference to message signals of other mobile stations.

What is claimed is:

1. A signal transmission method of a CDMA mobile communications system carrying out communications between a plurality of mobile stations which carry out power transmission control of both an open loop control method and a closed loop control method and a base station by code division multiple access, said signal transmission method comprising the steps of:

transmitting a first signal at a first transmission power from at least one of said plurality of mobile stations to the base station;

transmitting a second signal at a second transmission power which is higher than said first transmission power from said at least one of said plurality of mobile stations to said base station after transmitting said first signal; and at said at least one of said plurality of mobile stations, carrying out open loop control within the period of transmitting said first signal, and carrying out closed loop control after carrying out the open loop control.

2. The signal transmission method of the CDMA mobile communications system as claimed in claim 1, wherein an information transmission rate of said first signal is lower than an information transmission rate of said second signal and a spreading factor of said first signal is higher than a spreading factor of said second signal.

3. The signal transmission method of the CDMA mobile communications system as claimed in claim 1 or 2, wherein said at least one of said plurality of mobile stations transmits said first signal to said base station through a channel which is common to said plurality of mobile stations to reserve a channel which is particular to said mobile station and transmits said second signal to said base station through said particular channel.

4. The signal transmission method of the CDMA mobile communications system as claimed in claim 3, wherein a signal which is transmitted in response to said first signal by base station to the mobile station which sent said first signal includes a signal for controlling said second transmission power of said second signal transmitted by said mobile station and said mobile station decides said second transmission power of said second signal in accordance with said controlling signal.

5. A signal transmission method of a CDMA mobile communications system carrying out communications between a plurality of mobile stations which carry out power transmission control of both an open loop control method and a closed loop control method and a base station by code division multiple access, said signal transmission method comprising the steps of:

transmitting a signal at a first transmission power from at least one of said plurality of mobile stations to the base station during a predetermined period of time;

transmitting said signal at a second transmission power which is higher than said first transmission power from said mobile station to said base station after said predetermined period of time; and at said at least one of said plurality of mobile stations, carrying out open loop control within said predetermined period of time, and carrying out closed loop control after carrying out the open loop control.

6. The signal transmission method of the CDMA mobile communications system as claimed in claim 5, wherein an information transmission rate of said signal transmitted during said predetermined period of time is lower than an information transmission rate of said signal transmitted after said predetermined period of time and a spreading factor of said signal transmitted during said predetermined period of time is higher than a spreading factor of said signal transmitted after said predetermined period of time.

7. The signal transmission method of the CDMA mobile communications system as claimed in claim 5 or 6, wherein said plurality of mobile stations do not send a signal in mute intervals and send a speech signal in speech spurt intervals in speech communications, and send a speech signal at said first transmission power during said predetermined period of time after a transition from a mute interval to a speech spurt interval and send said speech signal at said second transmission power after said predetermined period of time.

8. A signal transmission method of a CDMA mobile communications system carrying out communication between a plurality of mobile stations which carry out power transmission control of both an open loop control method and a closed loop control method and a base station by code division multiple access, said signal transmission method comprising the steps of:

transmitting a first frame of a signal at a first transmission power from at least one of said plurality of mobile stations to the base station;

transmitting at least a second frame of said signal at a second transmission power which is higher than said first transmission power from said at least one of said plurality of mobile stations to said base station; and at said at least one of said plurality of mobile stations, carrying out open loop control within the period of transmitting said first frame of said signal, and carrying out closed loop control after carrying out the open loop control.

9. The signal transmission method of the CDMA mobile communications system as claimed in claim 8, wherein an information transmission rate of said first frame of said signal is lower than an information transmission rate of said second frame of said signal and a spreading factor of said first frame of said signal is higher than a spreading factor of said second frame of said signal.

10. The signal transmission method of the CDMA mobile communications system as claimed in claim 8 or 9, wherein said at least one of said plurality of mobile stations does not send a signal in mute intervals and encodes a speech signal into a burst signal and sends the burst signal in speech spurt intervals in speech communications, and sends a burst signal at said first transmission power for said first frame of said signal after a transition from a mute interval to a speech spurt interval and sends said burst signal at said second transmission power for said second frame of said signal.

11. A mobile station of a CDMA mobile communications system communication with a base station by code division multiple access and carrying out power transmission control of both an open loop control method and a closed loop control method, said mobile station comprising:

means for transmitting a first signal at a first transmission power to said base station;

means for transmitting a second signal at a second transmission power which is higher than said first transmission power to said base station after transmitting said first signal; and means for carrying out open loop control within the period of transmitting said first signal, and carrying out closed loop control after carrying out the open loop control.

12. The mobile station of the CDMA mobile communications system as claimed in claim 11, wherein an information transmission rate of said first signal is lower than an information transmission rate of said second signal and a spreading factor of said first signal is higher than a spreading factor of said second signal.

13. The mobile station of the CDMA mobile communications system as claimed in claim 11, wherein said mobile station, being a first mobile station, transmits said first signal to said base station through a channel which is common to said first mobile station and at least one second mobile station to reserve a channel which is particular to said first mobile station and transmits said second signal to said base station through s aid particular channel.

14. The mobile station of the CMDA mobile communications system as claimed in claim 13, further comprising:

means for receiving a signal which is transmitted in response to said first signal by said base station; and means for deciding said second transmission power of said second signal in accordance with a signal included in said received signal for controlling said second transmission power of said second signal.

15. A mobile station of a CDMA mobile communications system communicating with a base station by code division multiple access and carrying out power transmission control of both an open loop control method and a closed loop control method, said mobile station comprising:

means for transmitting a signal at a first transmission power to a base station during a predetermined period of time;

means for transmitting said signal at a second transmission power which is higher than said first transmission power to said base station after said predetermined period of time; and means for carrying out open loop control within said predetermined period of time, and carrying out closed loop control after carrying out the open loop control.

16. The mobile station of the CDMA mobile communications system as claimed in claim 15, wherein an information transmission rate of said signal transmitted during said predetermined period of time is lower than an information transmission rate of said signal transmitted after said predetermined period of time and a spreading factor of said signal transmitted during said predetermined period of time is higher than a spreading factor of said signal transmitted after said predetermined period of time.

17. The mobile station of the CDMA mobile communications system as claimed in claim 15 or 16, wherein said mobile station does not send a signal in mute intervals and sends a speech signal in speech spurt intervals in speech communications, and sends a speech signal at said first transmission power during said predetermined period of time after a transition from a mute interval to a speech spurt interval and sends said speech signal at said second transmission power after said predetermined period of time.

18. A mobile station of a CDMA mobile communications system communication with a base station by code division multiple access and carrying out power transmission control of both an open loop control method and a closed loop control method, said mobile station comprising:

means for transmitting a first frame of a signal at a first transmission power to a base station;

means for transmitting a second frame of said signal at a second transmission power which is higher than said first transmission power to said base station; and means for carrying out open loop control within the period of transmitting said first frame of said signal, and carrying out closed loop control after carrying out the open loop control.

19. The mobile station of the CDMA mobile communications system as claimed in claim 18, wherein an information transmission rate of said first frame of said signal is lower than an information transmission rate of said second frame of said signal and a spreading factor of said first frame of said signal is higher than a spreading factor of said second frame of said signal.

20. The mobile station of the CDMA mobile communications system as claimed in claim 18 or 19, wherein said mobile station does not send a signal in mute intervals and encodes a speech signal into a burst signal and sends the burst signal in speech spurt intervals in speech communications, and sends a burst signal at said first transmission power for said first frame of said signal after a transition from a mute interval to a speech spurt interval and sends said burst signal at said second transmission power for said second frame of said signal.

21. A base station of a CDMA mobile communications system communicating by code division multiple access with a plurality of mobile stations which carry out power transmission control of both an open loop control method and a closed loop control method, said base station comprising:

first signal receiving means for receiving a first signal at a first spreading factor from a mobile station; and second signal receiving means for receiving a second signal at a second spreading factor which is lower than said first spreading factor from said mobile station;

wherein said mobile station carries out open loop control within the period of transmitting said first signal, and carries out closed loop control after carrying out the open loop control.

22. The base station of the CDMA mobile communications system as claimed in claim 21, further comprising:

means for generating a signal which controls a transmission power of said second signal, based on a receiving power of said first signal.

23. The base station of the CDMA mobile communications system as claimed in claim 21 or 22, wherein said base station further comprises designating means for designating a channel particular to each mobile station of said plurality of mobile stations, said first signal receiving means receives a first signal from each of said plurality of mobile stations through a channel common to said plurality of mobile stations, said designating means designates a channel particular to each mobile station of said plurality of mobile stations, and said second signal receiving means receives seconds signals transmitted by said plurality of mobile stations through said particular channels.

24. A base station of a CDMA mobile communications system communicating by code division multiple access with mobile stations which carry out power transmission control of both an open loop control method and a closed loop control method, said base station comprising:

first receiving means for receiving a first frame of a signal at a first spreading factor from a mobile station; and second receiving means for receiving a second frame of said signal at a second spreading factor which is lower than said first spreading factor from said mobile station;

wherein said mobile station carries out open loop control within the period of transmitting said first frame of said signal, and carries out closed loop control after carrying out the open loop control.

25. The base station of the CDMA mobile communications system as claimed in claim 24, wherein said signal is a burst signal and said first receiving means receives said first frame of said signal at said first spreading factor and said second receiving means receives the second frames of said burst signal at said second spreading factor.

* * * * *

UNITED STATES PATENT AND TRADEMARK OFFICE
CERTIFICATE OF CORRECTION

PATENT NO.    : 6,310,868 B2
DATED         : October 30, 2001
INVENTOR(S)   : Uebayashi et al.

It is certified that error appears in the above-identified patent and that said Letters Patent is hereby corrected as shown below:

<u>Title page,</u>
Item [22] under PCT Filed, "Jun. 17, 1997" should be -- Jun. 18, 1997 --.

Signed and Sealed this

Fourth Day of June, 2002

*Attest:*

*Attesting Officer*

JAMES E. ROGAN
*Director of the United States Patent and Trademark Office*